(12) United States Patent
Orlando et al.

(10) Patent No.: US 6,681,558 B2
(45) Date of Patent: Jan. 27, 2004

(54) METHOD OF INCREASING ENGINE TEMPERATURE LIMIT MARGINS

(75) Inventors: Robert Joseph Orlando, West Chester, OH (US); Paul Cooker, Finneytown, OH (US)

(73) Assignee: General Electric Company, Schenectady, NY (US)

( * ) Notice: Subject to any disclaimer, the term of this patent is extended or adjusted under 35 U.S.C. 154(b) by 54 days.

(21) Appl. No.: 09/817,884

(22) Filed: Mar. 26, 2001

(65) Prior Publication Data

US 2002/0134070 A1 Sep. 26, 2002

(51) Int. Cl.$^7$ ................................................ F23R 3/00
(52) U.S. Cl. ........................................................ 60/204
(58) Field of Search .......................... 60/204, 233, 242, 60/235, 239

(56) References Cited

U.S. PATENT DOCUMENTS

| | | | |
|---|---|---|---|
| 3,777,479 A | * 12/1973 | Hagen | .......................... 60/235 |
| 3,797,233 A | * 3/1974 | Webb et al. | ................ 60/226.1 |
| 3,854,287 A | 12/1974 | Rembold | |
| 4,313,167 A | 1/1982 | Brown | |
| 4,487,016 A | 12/1984 | Schwarz et al. | |
| 4,668,162 A | 5/1987 | Cederwall et al. | |
| 4,856,272 A | 8/1989 | Putman et al. | |
| 5,048,285 A | 9/1991 | Schmitt et al. | |
| 5,081,830 A | 1/1992 | Schwarz et al. | |
| 5,284,347 A | 2/1994 | Pope | |
| 5,379,584 A | * 1/1995 | Windish et al. | ................ 60/204 |
| 5,517,819 A | * 5/1996 | Martin | .......................... 60/204 |
| 5,931,636 A | 8/1999 | Savage et al. | |

* cited by examiner

Primary Examiner—Ehud Gartenberg
(74) Attorney, Agent, or Firm—Nate Herkamp; Sonnenschein Nath & Rosenthal LLP (57) ABSTRACT

A method of extending a useful serviceable life of a gas turbine engine by increasing a limiting exhaust gas temperature margin degraded by engine use without replacing engine hardware. The method includes adjusting at least one engine parameter selected from a first group of engine parameters including a nozzle area and a rotor speed.

14 Claims, 8 Drawing Sheets

METHOD OF INCREASING ENGINE TEMPERATURE LIMIT MARGINS

BACKGROUND OF THE INVENTION

The present invention relates generally to gas turbine engines, and more particularly to a method of increasing service intervals by increasing engine gas temperature limit margins.

Flowpath components deteriorate inside gas turbine engines during operation. As the components deteriorate, engine controls automatically make adjustments to meet engine power requirements. These adjustments increase flowpath gas temperatures. New engines typically have gas temperature margins to allow for temperature increases during use. However, after extended use, the temperature margin becomes sufficiently low that the engine must be serviced. To recover temperature margin, the engine is overhauled at a service facility. During the overhaul, various deteriorated and damaged engine components are replaced. Such overhauls are expensive and time consuming. It is envisioned that substantial savings could be achieved if the number and frequency of overhauls were reduced. Further, if overhauls could be delayed to coincide with scheduled facility or airframe maintenance or with replacement of life limited components within the engine, it is envisioned that substantial savings could be achieved.

Moreover, because life limited components are sometimes replaced sooner than necessary when the engine is overhauled to recover engine gas temperature margin, optimal use of the life limited components is not achieved. Replacing life limited components before their lives are entirely exhausted necessitates more components being used over the life of an engine which increases operating expenses. Maintaining spare components inventories to meet the more frequent replacement schedule further increases expenses. Thus, it is anticipated that recovering engine gas temperature margin without removing engines from service could provide a substantial savings.

SUMMARY OF THE INVENTION

Among the several features of the present invention may be noted the provision of a method of extending a useful serviceable life of a gas turbine engine by increasing a limiting exhaust gas temperature margin degraded by engine use without replacing engine hardware. The method includes adjusting at least one engine parameter selected from a first group of engine parameters including a nozzle area, and a rotor speed.

Other features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
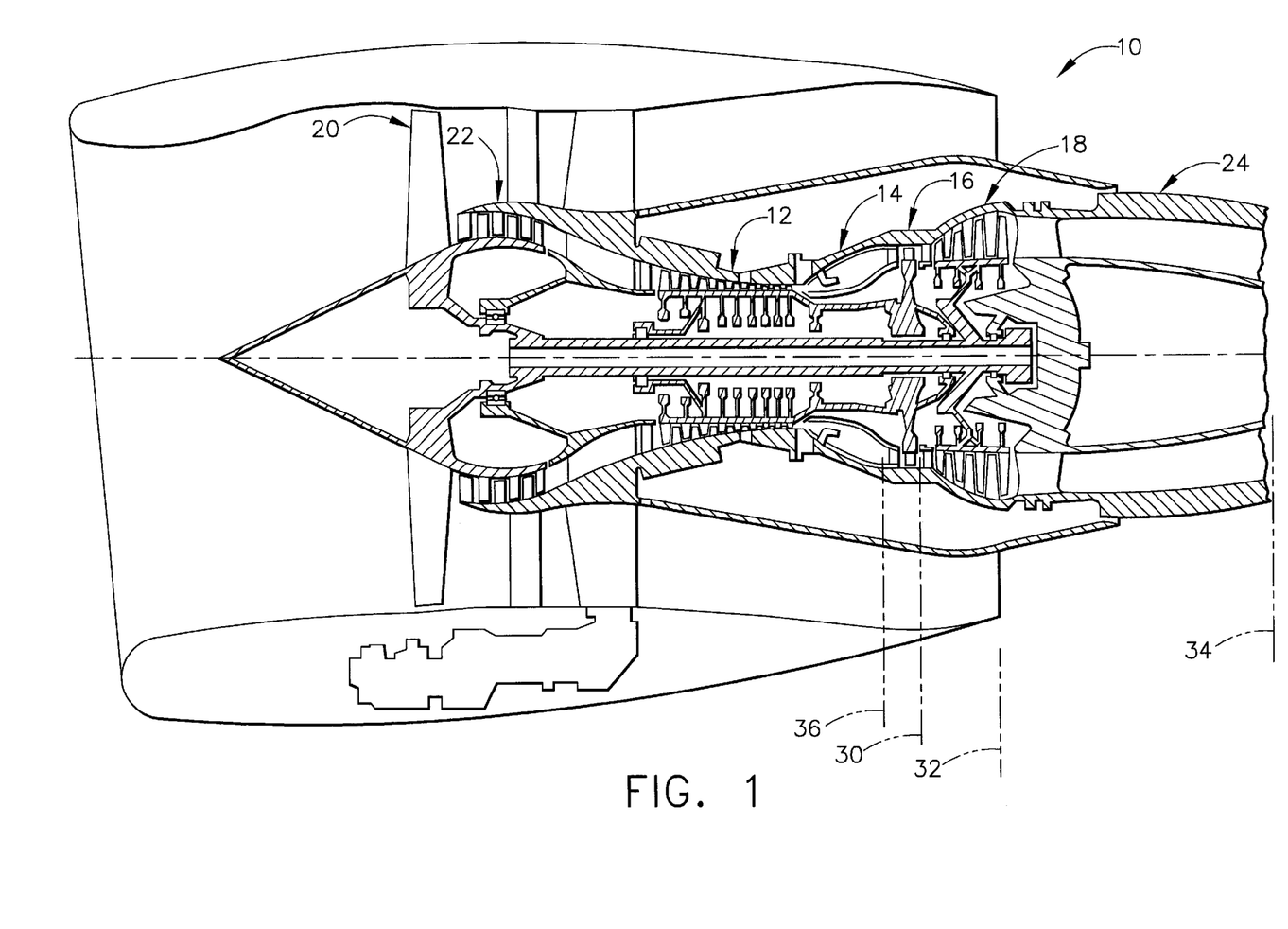
FIG. 1 is a schematic vertical cross section of a gas turbine engine.

Referring now to the drawings and in particular to FIG. 1, a conventional gas turbine engine is designated in its entirety by the reference numeral 10. The gas turbine engine 10 includes a high pressure compressor (generally designated by 12) for compressing air traveling through the engine, a combustor (generally designated by 14) downstream to the compressor for heating the compressed air, and a high pressure turbine (generally designated by 16) downstream from the combustor for driving the high pressure compressor. In addition, most conventional gas turbine engines 10 have a low pressure turbine (generally designated by 18) downstream from high pressure turbine 16 for driving a fan (generally designated by 20) upstream from the high pressure compressor 12. Still further, many engines 10, particularly turbofan engines, have a booster (generally designated by 22) between the fan 20 and the high pressure compressor 12 for further compressing flowpath air. An exhaust nozzle (generally designated by 24) downstream from the low pressure turbine 18 directs air leaving the engine 10.

As is well understood by those of ordinary skill in the art, the power generated by the engine 10 is dependent on various engine parameters such as flowpath areas. Some of these parameters are set when the engine is designed and built. Other parameters such as fuel flow may be adjusted by complex engine control systems (not shown) during engine operation to obtain the desired power. These control systems also monitor various engine parameters such as rotor speeds, flowpath temperatures and flowpath pressures.

The method of the present invention is used to extend a useful serviceable life of a gas turbine engine 10 by increasing a limiting gas temperature margin degraded by engine use. In typical applications, the limiting gas temperature margin is a high pressure turbine 16 exhaust gas temperature margin generally located at plane 30. However, those skilled in the art will appreciate that the limiting temperature margin may be at other positions along the flowpath without departing from scope the present invention. Rather than replacing components (i.e., hardware), the method of the present invention is facilitated by using components which are capable of varying the areas at particular locations along the flowpath of the engine 10.

The method comprises adjusting at least one engine parameter selected from a group of engine parameters including nozzle areas and rotor speeds. For instance, in one embodiment the engine parameters selected for adjustment may include a fan 20 exhaust nozzle area (generally located at plane 32), a core exhaust nozzle area (generally located at plane 34), a high pressure turbine 16 inlet area (generally located at plane 36), and/or a low pressure turbine 18 inlet area (generally located at plane 30). The rotor speed selected for adjustment may include the fan 20 speed.

Figure 2:
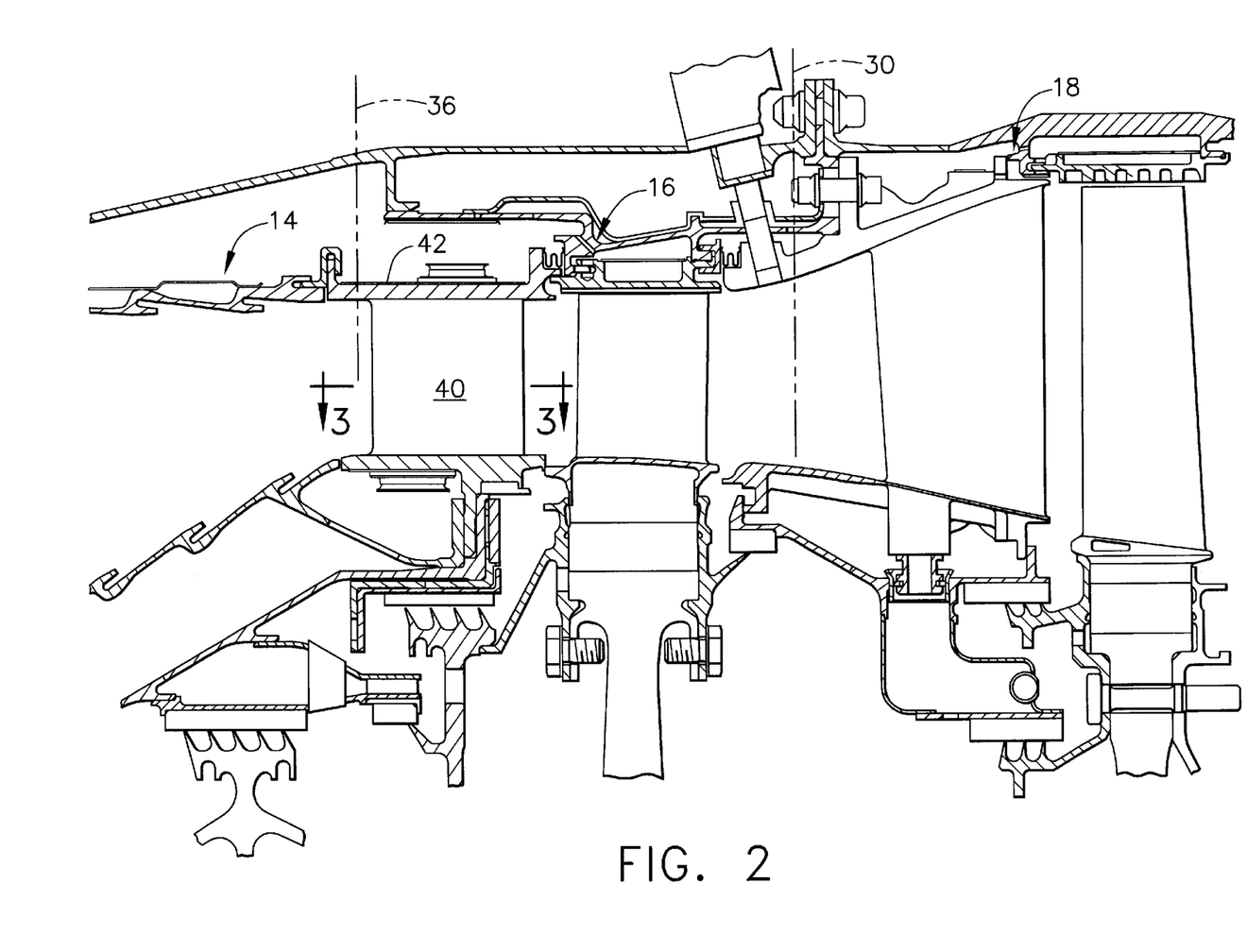
FIG. 2 is a detail of the cross section of FIG. 1 showing a portion of a turbine.
Figure 3:
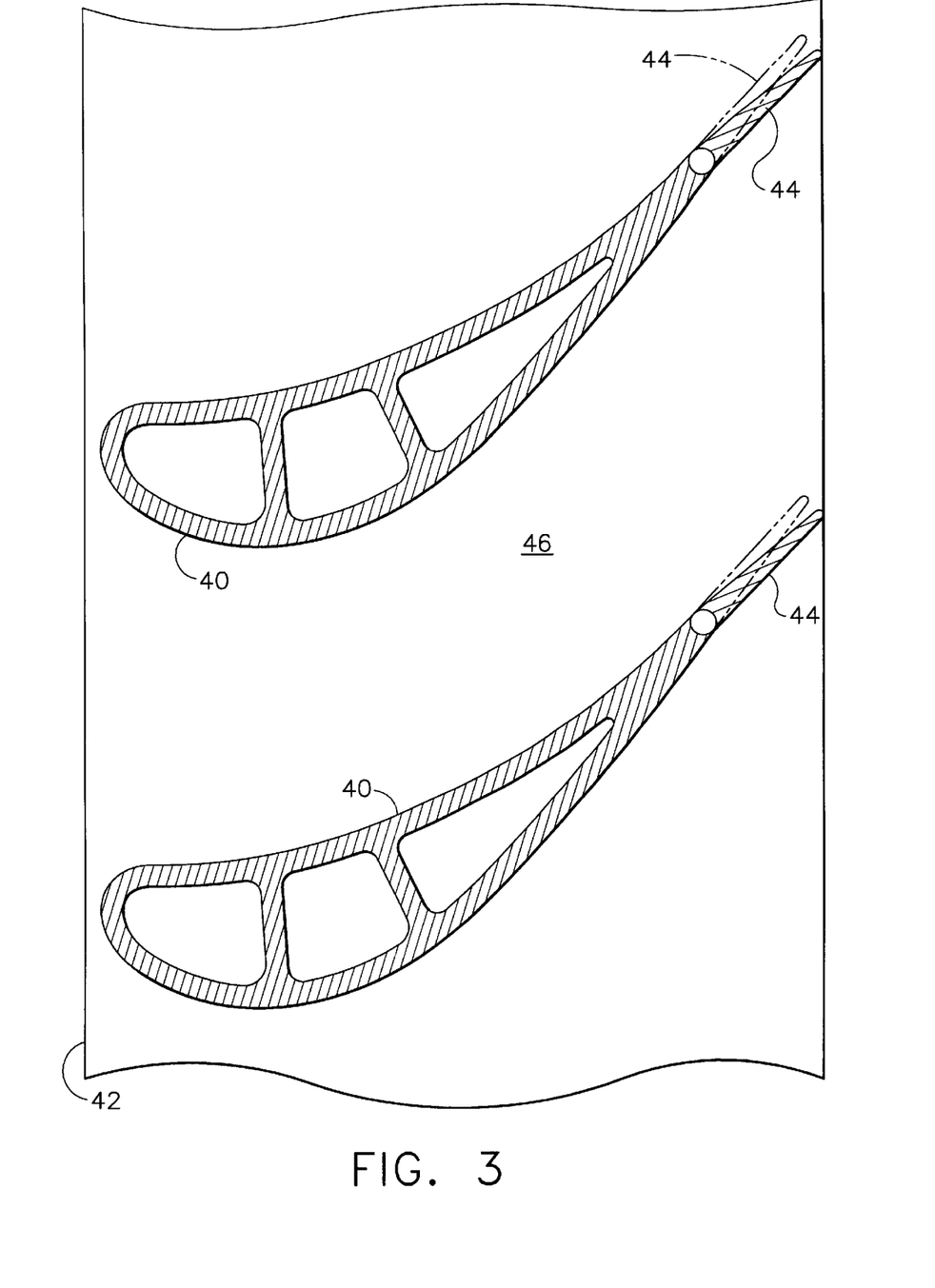
FIG. 3 is a schematic cross section of a vaned nozzle taken along line 3—3 of FIG. 2 showing a pivoting trailing edge.
Figure 4:
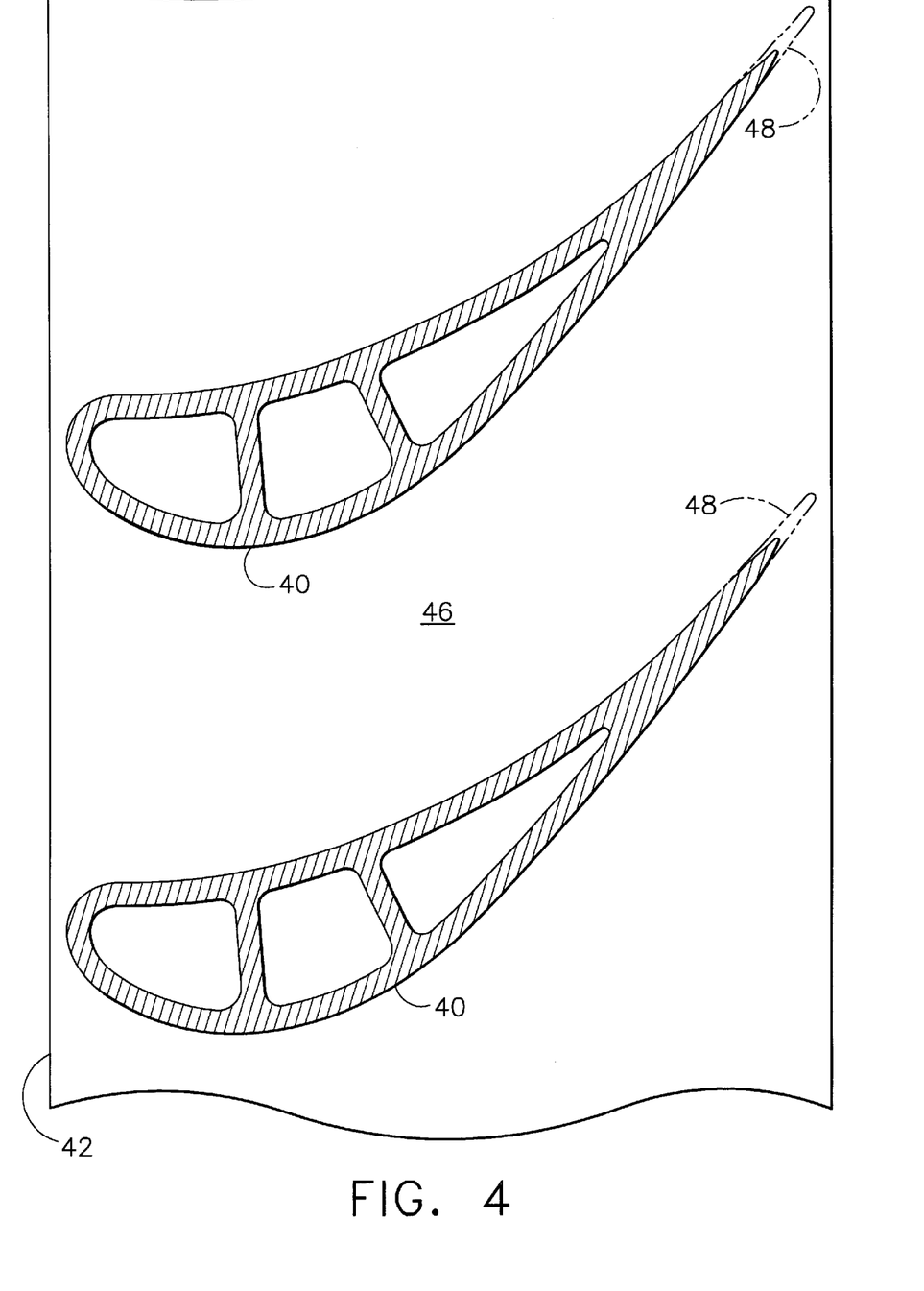
FIG. 4 is a schematic cross section taken through a vaned nozzle having an ablatable trailing edge.
Figure 5:
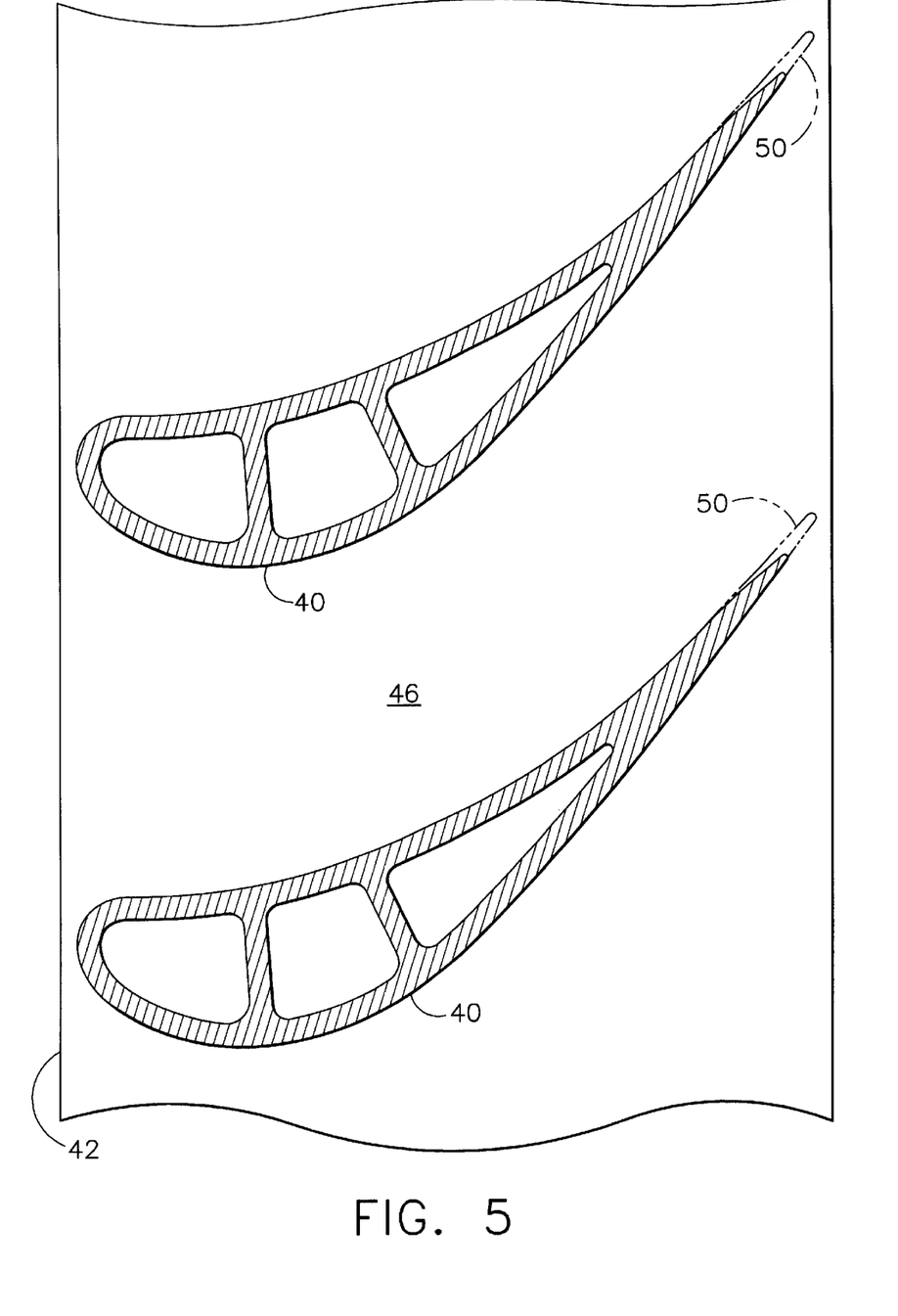
FIG. 5 is a schematic cross section taken through a vaned nozzle having a removable trailing edge.

The selected areas may be adjusted in any conventional way. As will be appreciated by those skilled in the art, the high pressure turbine 16 and low pressure turbine 18 inlet areas may be adjusted by varying an attack angle of at least a portion of the corresponding vanes like conventional variable stator vanes. As illustrated in FIG. 2, vanes 40 of the high pressure turbine 16 may be configured to vary a minimum area of the corresponding nozzle 42. For example, the vanes 40 may include a pivotable trailing edge portion 44 as illustrated in FIG. 3 for changing the minimum throat area of the passage 46 between the vanes. Alternatively, as shown in FIG. 4 the vanes 40 may include a trailing edge portion 48 constructed from an ablatable material which erodes at a predetermined rate during extending engine operation to increase the minimum throat area of the passage 46 between the vanes by a predictable amount. Still further, as illustrated in FIG. 5 the minimum throat area between the vanes 40 may be changed by either inserting or removing an insert 50 covering at least a portion of the vanes.

Figure 6:
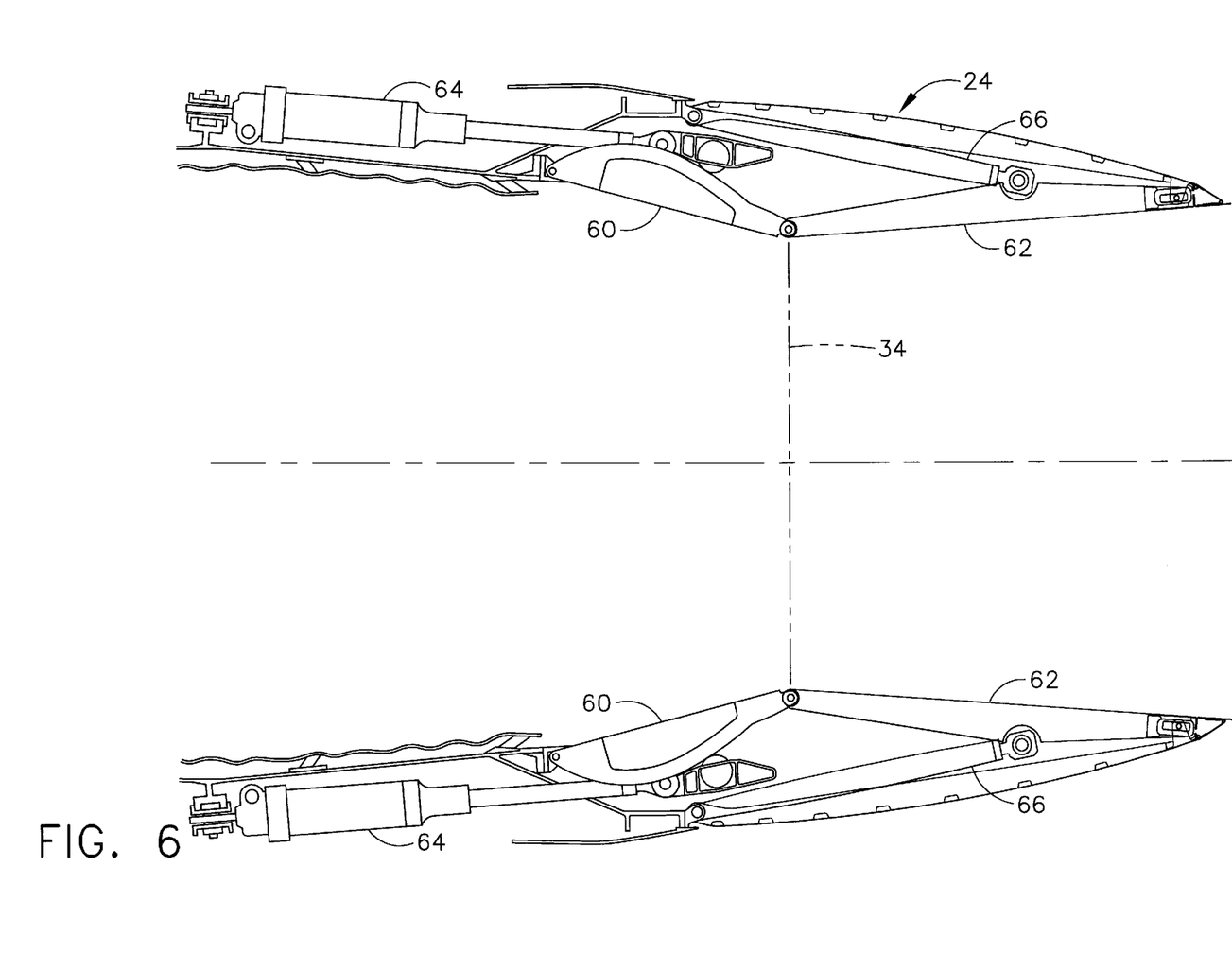
FIG. 6 is a cross section taken through an exhaust nozzle having moveable inner panels.
Figure 7:
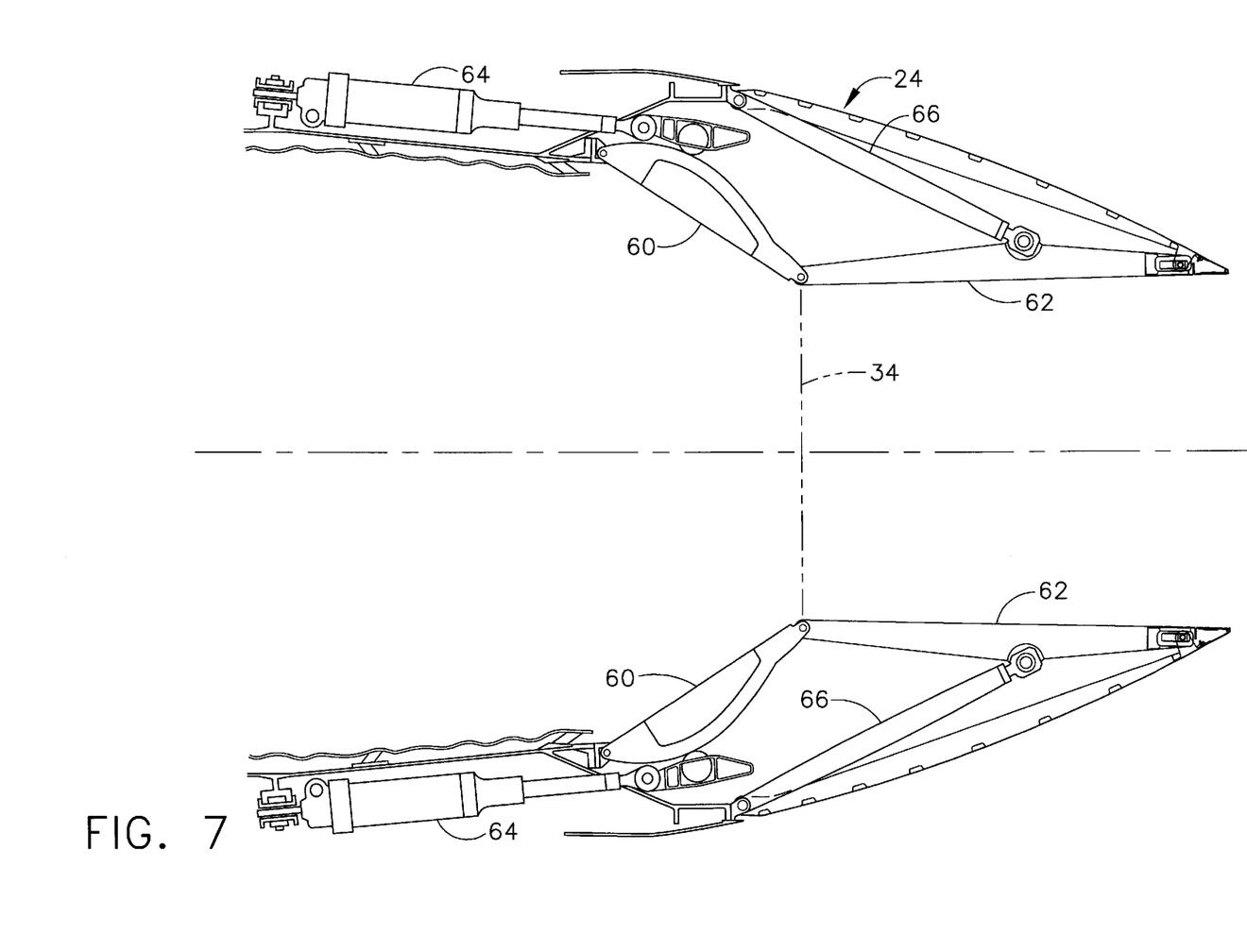
FIG. 7 is a cross section of the nozzle of FIG. 6 showing the panels in an alternate position.
Figure 8:
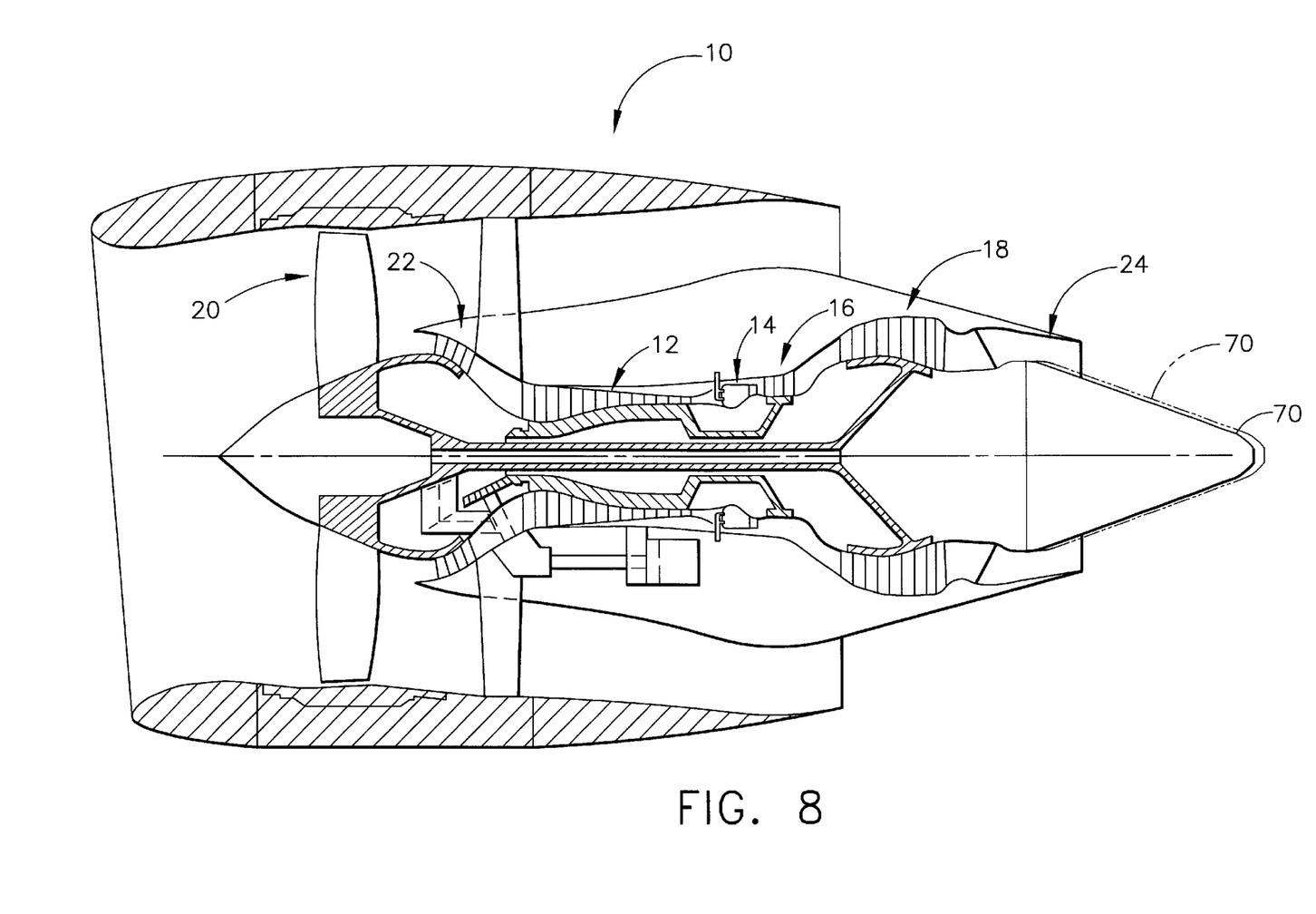
FIG. 8 is a cross section taken through an exhaust nozzle having a moveable center body.

It is further envisioned that the fan exhaust nozzle area and core exhaust nozzle area may be varied using a variable exhaust nozzle configuration such as those employed in conventional military aircraft engine afterburners. One such configuration for varying the area of an exhaust nozzle 24 is illustrated in FIGS. 6 and 7. As is well understood by those skilled in the art, the variable area exhaust nozzle 24 includes pivotally attached panels 60, 62 which are selectively positionable by hydraulic actuators 64 and linkages 66 to change the flowpath area through the exhaust nozzle. It is further envisioned that panels (not shown) may be inserted into or removed from the exhaust nozzle 24 to alter the area thereof. Still further, it is envisioned that the exhaust nozzle 24 might include an ablatable material which erodes over time as discussed above with respect to the high pressure turbine nozzle 42 to increase the flowpath area of the exhaust nozzle. In another embodiment illustrated in FIG. 8, the exhaust nozzle 24 may include a central plug 70 which may be selectively positioned such as with hydraulic actuators (not shown) to alter the flowpath area of the exhaust nozzle.

Although the method described above may be performed by trial and error, in one embodiment the method is performed by assessing an effect adjusting the flowpath areas and/or rotor speeds would have on other engine parameters. The other engine parameters may include a total net engine thrust, a low pressure turbine inlet temperature, a booster stall margin, a high pressure compressor stall margin, a high pressure turbine inlet temperature, a high pressure rotor speed, a high pressure compressor exit temperature, and/or a specific fuel consumption. To assess the effect of adjusting the areas or speeds might have on these other parameters, a conventional mathematical model may be made of the engine performance. The model could be used to calculate an anticipated effect the adjustment would have on the other parameters, and the amounts by which the areas or speeds are adjusted may be selected based on the anticipated effect calculated by the model. Still further, various engine parameters selected from a group of engine parameters may be monitored and the mathematical model may be adjusted to account for the monitored engine parameters. For example, it is envisioned that fan speed, a compressor inlet pressure, a compressor outlet pressure, and/or a compressor outlet temperature could be monitored and the mathematical model could be adjusted accordingly to tailor the mathematical model to the particular engine being evaluated.

Once the adjustment is made to the engine, it may be run to verify that the adjustment was optimal. It is envisioned that parameters may be monitored during the test run and the mathematical model may be readjusted to account for the actually obtained parameters. The amount by which to adjust the areas or speeds may be selected based on the anticipated effect calculated from the readjusted mathematical model of engine performance.

It is envisioned that conventional optimization programs may be employed to optimize the amounts by which the areas or speeds are adjusted to achieve desired engine characteristics. For instance, specific fuel consumption, various engine temperatures, thrust and engine gas temperatures may be evaluated and weighted to determine an optimal adjustment to the engine parameters.

To initially assess the viability of the method of the present invention, a mathematical model of a conventional commercial aircraft engine was made. The model had a high pressure turbine flow function scalar of 1.000, a low pressure turbine flow function scalar of 1.000, a core exhaust nozzle area of 442.4 square inches (sq. in.), a fan exhaust nozzle area of 1209.7 sq. in., and a corrected percent fan speed of 89.04 percent. For a new (i.e., undeteriorated) engine, the model predicted a net thrust of 12890 pounds (lb.), a high pressure turbine exhaust gas temperature of 791 degrees centigrade (C), a booster stall margin of 11 percent, a high pressure compressor stall margin of 35 percent, a high pressure turbine inlet temperature of 2738 degrees Fahrenheit (F), a high pressure compressor speed of 14556 rpm and a high pressure compressor exit temperature of 1475 degrees Rankin (R) at take off conditions and a specific fuel consumption of 0.6159 at cruise conditions. For a fully deteriorated engine, the model predicted a net thrust of 13042 lb., a high pressure turbine exhaust gas temperature of 880 C, a booster stall margin of 5 percent, a high pressure compressor stall margin of 30 percent, a high pressure turbine inlet temperature of 2912 F, a high pressure compressor speed of 14407 rpm and a high pressure compressor exit temperature of 1486 R at take off conditions and a specific fuel consumption of 0.6517 at cruise conditions. Changing the model parameters so the high pressure turbine flow function scalar was 1.033, the low pressure turbine flow function scalar was 1.100, the core exhaust nozzle area was 476.8 sq. in., the fan exhaust nozzle area was 1209.7 sq. in., and the corrected percent fan speed was 89.04 percent, resulted in a net thrust of 12891 lb., a high pressure turbine exhaust gas temperature of 843 C, a booster stall margin of 11 percent, a high pressure compressor stall margin of 36 percent, a high pressure turbine inlet temperature of 2842 F, a high pressure compressor speed of 14551 rpm, and a high pressure compressor exit temperature of 1486 R at take off conditions and a specific fuel consumption of 0.6556 at cruise conditions. Each of the resulting parameters were deemed to be within acceptable operating limits. Moreover, the model predicted a high pressure turbine exhaust gas margin recovery of 37 C. It is envisioned that such a recovered temperature margin would permit the engine to remain in service, possibly until the next scheduled airframe maintenance is to be performed.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A method of extending a useful serviceable life of a gas turbine engine by increasing a limiting gas temperature margin degraded by engine use without replacing engine hardware, said method comprising adjusting at least one engine parameter selected from a first group of engine parameters including a nozzle area and a rotor speed.

2. A method as set forth in claim 1 wherein the first group of engine parameters includes a fan exhaust nozzle area, a core exhaust nozzle area, a high pressure turbine inlet area and a low pressure turbine inlet area.

3. A method a set forth in claim 1 wherein the first group of engine parameters includes a fan speed.

4. A method as set forth in claim 1 wherein the nozzle area is adjusted by pivoting at least a portion of a corresponding nozzle.

5. A method as set forth in claim 1 wherein the nozzle area is adjusted by installing an insert in a corresponding nozzle.

6. A method as set forth in claim 1 wherein the nozzle area is adjusted by removing an insert from a corresponding nozzle.

7. A method as set forth in claim 1 wherein the nozzle area is adjusted by removing an ablatable material from a corresponding nozzle.

8. A method as set forth in claim 1 wherein the limiting gas temperature margin is a high pressure turbine exhaust gas temperature margin.

9. A method as set forth in claim 1 further comprising assessing an affect adjusting said engine has on at least one engine parameter selected from a second group of engine parameters including a total net engine thrust, a low pressure turbine inlet temperature, a booster stall margin, a high pressure compressor stall margin, a high pressure turbine inlet temperature, a high pressure rotor speed, a high pressure compressor exit temperature, and a specific fuel consumption.

10. A method as set forth in claim 9 wherein assessing the affect the adjusting step has on the parameter selected from said second group of engine parameters includes:

mathematically modeling engine performance to calculate an anticipated affect adjusting the parameter in said first group will have on the parameter in said second group; and selecting an amount to adjust the parameter in said first group based on said anticipated affect.

11. A method as set forth in claim 10 further comprising:

monitoring at least one engine parameter selected from a third group of engine parameters including a fan speed, a compressor inlet pressure, a compressor outlet pressure, and a compressor outlet temperature; and adjusting the mathematically modeled engine performance to account for the monitored engine parameter.

12. A method as set forth in claim 11 further comprising:

running the engine after adjusting the parameter selected from the first group;

monitoring the parameter selected from the third group;

re-adjusting the mathematically modeled engine performance to account for the monitored parameter; and re-selecting the amount to adjust the parameter in said first group based on the anticipated affect provided by the re-adjusted modeled engine.

13. A method as set forth in claim 10 further comprising adjusting the mathematically modeled engine performance to account for assumed variations in engine parameters caused by engine use.

14. A method as set forth in claim 10 further comprising:

iteratively calculating the anticipated affect adjusting the parameter in said first group will have on the parameter in said second group; and optimizing the amount the parameter in said first group is adjusted based on said interative calculations.

* * * * *